United States Patent
Smaragdis et al.

(10) Patent No.: US 7,318,005 B1
(45) Date of Patent: Jan. 8, 2008

(54) SHIFT-INVARIANT PROBABILISTIC LATENT COMPONENT ANALYSIS

(75) Inventors: Paris Smaragdis, Brookline, MA (US); Bhiksha Ramakrishnan, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 11/482,492

(22) Filed: Jul. 7, 2006

(51) Int. Cl.
*G06F 15/00* (2006.01)
*G06F 17/18* (2006.01)
(52) U.S. Cl. .................................................. 702/179
(58) Field of Classification Search ................ 702/179
See application file for complete search history.

(56) References Cited

U.S. PATENT DOCUMENTS

| | | | |
|---|---|---|---|
| 2002/0169730 A1* | 11/2002 | Lazaridis | 706/20 |
| 2004/0054572 A1* | 3/2004 | Oldale et al. | 705/10 |
| 2004/0095374 A1* | 5/2004 | Jojic et al. | 345/716 |
| 2005/0119829 A1* | 6/2005 | Bishop et al. | 702/2 |

OTHER PUBLICATIONS

Hofmann, Probabilistic Latent Semantic Analysis, 1999, Uncertainity in Artificial Intelligence, UAI'99.*
Brown, J.C., 1991. Calculation of a Constant Q Spectral Transform, in Journal of the Acoustical Society of America vol. 89, pp. 425-434.
Hofmann, T., 1999. Probabilistic Latent Semantic Analysis in Proceedings of the Fifteenth Conference on Uncertainty in Artificial Intelligence (UAI'99).
Lee D.D. and Seung H.S., 1999. Learning the parts of objects by non-negative matrix factorization. Nature, vol. 401, No. 6755. (Oct. 21, 1999), pp. 788-791.
Hoyer, P.O., 2004. Non-negative Matrix Factorization with sparseness constraints, Journal of Machine Learning Research 5:1457-1469, 2004.
Li, L. and Speed, T., 2000. Deconvolution of sparse positive spikes: is it ill-posed?, University of California at Berkeley, Department of Statistics Technical Report 586.
Smaragdis, P.; Brown, J.C., "Non-negative Matrix Factorization for Polyphonic Music Transcription", IEEE Workshop on Applications of Signal Processing to Audio and Acoustics (WASPAA), pp. 177-180, Oct. 2003.
Smaragdis, P., "Discovering Auditory Objects Through Non-Negativity Constraints", Statistical and Perceptual Audio Processing (SAPA), SAPA 2004, Oct. 2004.
Smaragdis, P., "Non-negative Matrix Factor Deconvolution; Extraction of Multiple Sound Sources from Monophonic Inputs", International Congress on Independent Component Analysis and Blind Signal Separation, ISBN: 3-540-23056-4, vol. 3195/2004, pp. 494, Sep. 2004 (Springer Lecture Notes in Computer Science).

* cited by examiner

*Primary Examiner*—John Barlow
*Assistant Examiner*—Cindy D. Khuu
(74) *Attorney, Agent, or Firm*—Dirk Brinkman; Clifton D. Mueller; Gene V. Vinokur

(57) ABSTRACT

A method decomposes input data acquired of a signal. An input signal is sampled to acquire input data. The input data is represented as a probability distribution. An expectation-maximization procedure is applied iteratively to the probability distribution to determine components of the probability distributions.

16 Claims, 8 Drawing Sheets

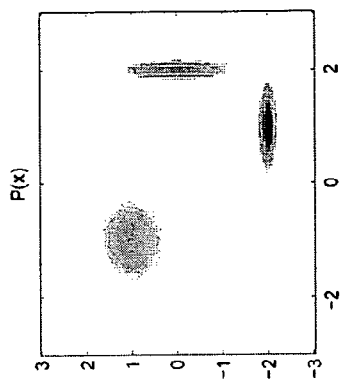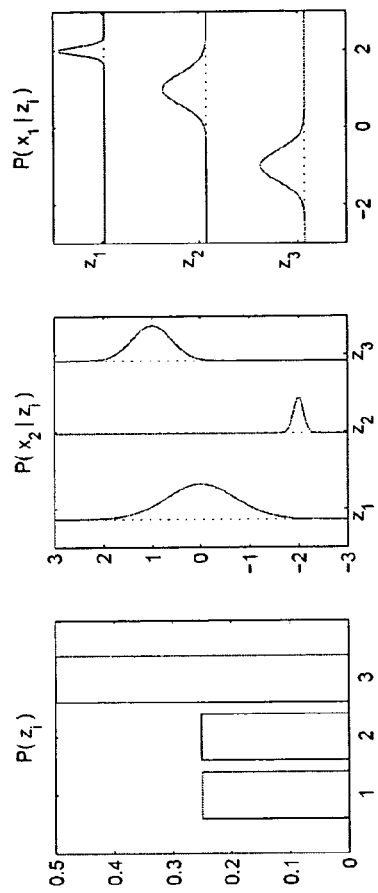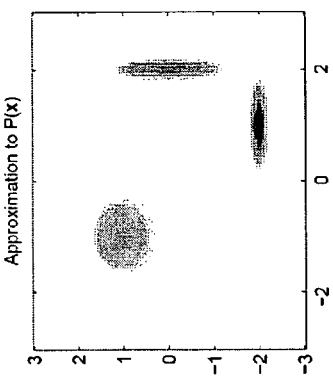

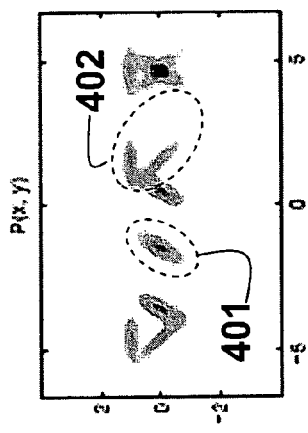
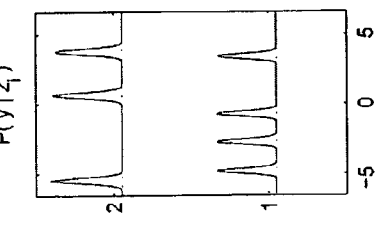
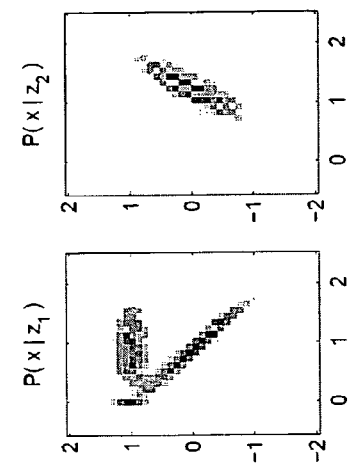
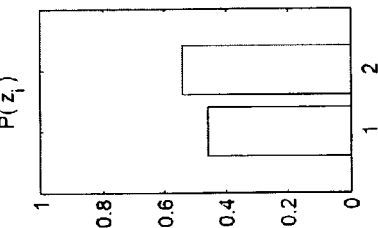
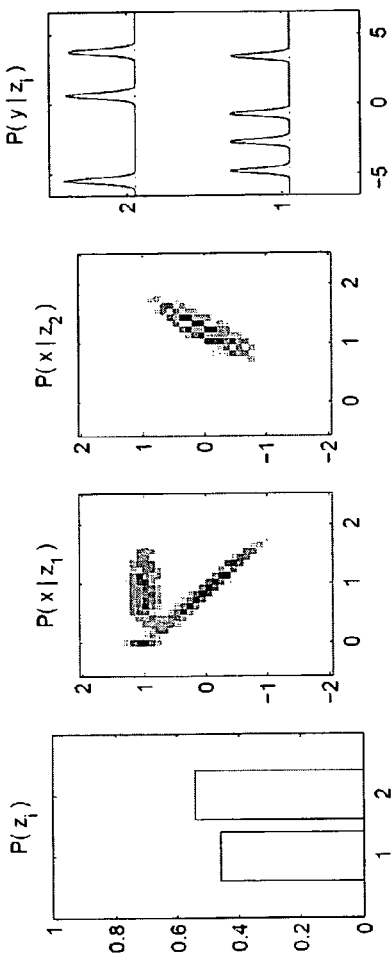
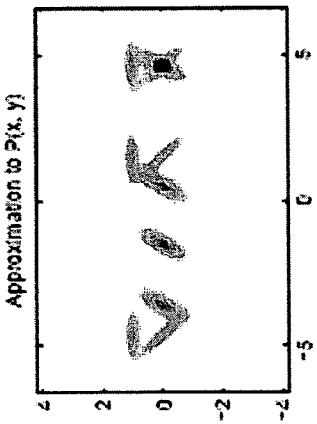
FIG. 4
FIG. 5A  FIG. 5B  FIG. 5C  FIG. 5D
FIG. 6

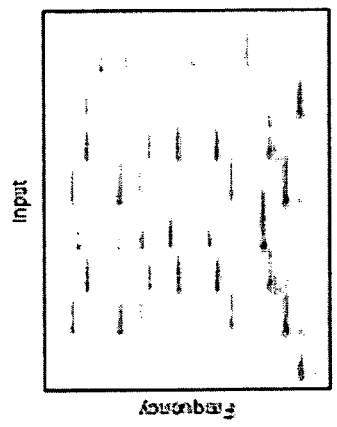
FIG. 10
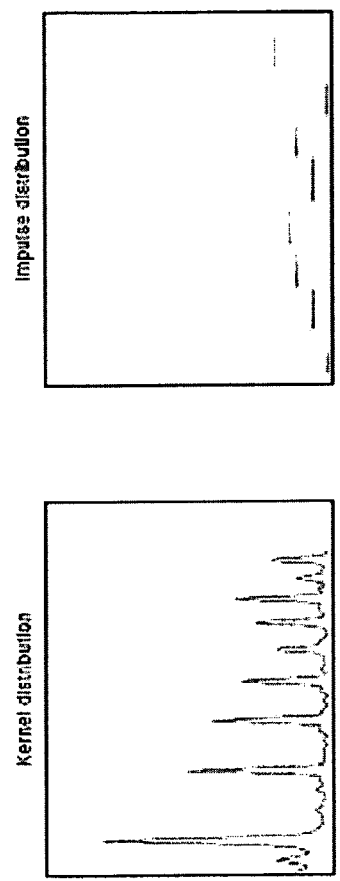
FIG. 11B
FIG. 11A
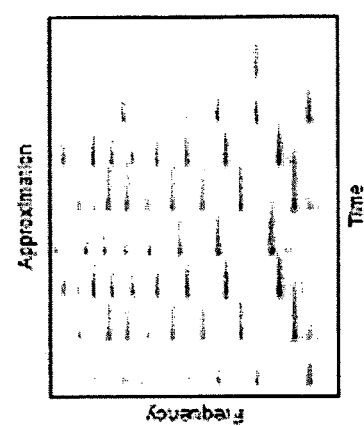
FIG. 12

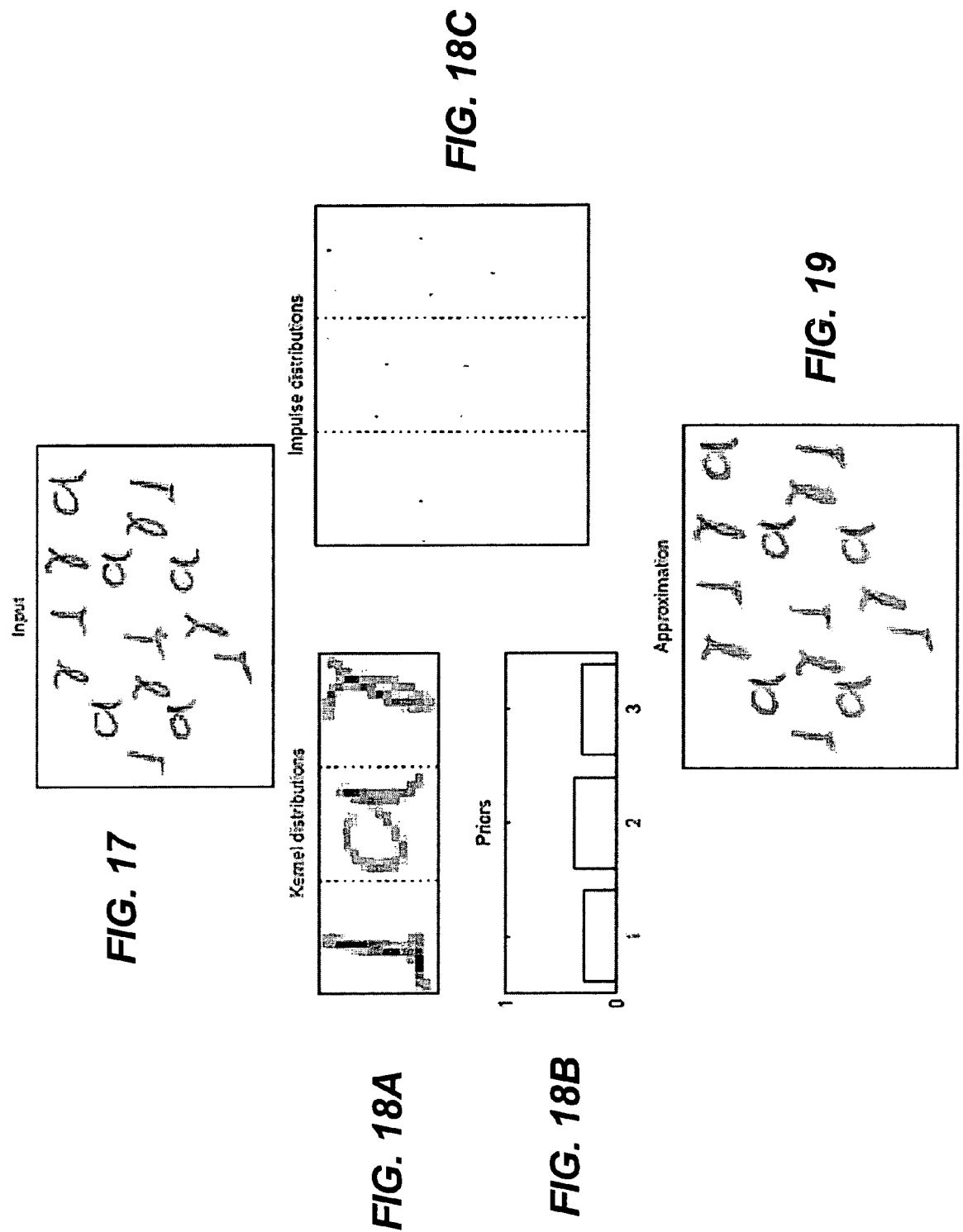

SHIFT-INVARIANT PROBABILISTIC LATENT COMPONENT ANALYSIS

FIELD OF THE INVENTION

This invention relates generally to analyzing data acquired of real world systems and phenomena, and more particularly to methods for determining low-dimensional components of complex, high-dimensional data structures, such as acoustic signals and images, or any arbitrary data set.

BACKGROUND OF THE INVENTION

Many practical applications in the fields of signal processing often preprocess input data using component analysis. Component analysis can reduce dimensionality, extract features, or discover underlying structures of the data.

Principal component analysis (PCA) and independent component analysis (ICA) are frequently employed for various tasks, such as feature discovery or object extraction. The statistical properties of PCA and ICA make them indispensable tools for machine learning applications.

Non-negative matrix factorization (NMF) can also be used for component analysis, Lee D. D., and Seung H. S., "Learning the parts of objects by non-negative matrix factorization," Nature, Vol. 401, No. 6755, 21 Oct. 1999, pp. 788-791. Non-negativity is a valuable property for working only with positive data. Because a large majority of acoustic, image and text data operations deal with positive only data, NMF presents an appropriate alternative to PCA and ICA. A particular reason for the success of NMF is that using non-negative components, in combination with non-negative weights, often translates to a meaningful solution.

In contrast, methods that do not use non-negativity yield a set of bases that contain negative elements. Then, cross-cancellation between the non-negative elements must be employed to approximate the input. Components with negative elements are hard to interpret in a positive only data framework and are often used for their statistical properties and not for the insight they provide of the underlying data structure. In contrast, NMF provides meaningful components for variety of data types such as images, and acoustic magnitude spectra.

However, the downside of NMF is that it is defined in a purely non-statistical framework, which prohibits NMF to be applied to probabilistic applications.

SUMMARY OF THE INVENTION

The embodiments of the invention provide a model and method for decomposing input data represented by probability distributions into a set of shift invariant components. The model is a latent variable model, which can be extended to deal with shift invariance in a probability space in order to model more complex input data. The embodiments of the invention also provide an expectation maximization procedure for estimating the set of shift invariant components.

Shift-invariant probabilistic latent component analysis (PLCA) is applied to input data represented according to the model. Shift invariance enables the method to discover components that appear in like the data at arbitrarily shifted positions, either temporally, spatially, or both. This property is desirable when dealing with input data such as images and acoustic signals, where translation of the same feature, such as objects or sounds, is often observed.

In contrast with a conventional linear decomposition, the invention decomposes in the probability density space. This provides an interesting statistical interpretation, and also helps to enforce implicitly non-negativity, while using probabilistic optimization techniques.

BRIEF DESCRIPTION OF THE DRAWINGS

FIG. 2A is a diagram of input data represented by three Gaussian functions according to an embodiment of the invention;

FIGS. 2B-2D are diagrams of components of the distributions of FIG. 2A obtained by the method according to an embodiment of the invention;

FIG. 3 is a diagram of output data approximated the input data by combing the components of FIGS. 2B-2C according to an embodiment of the invention;

FIG. 4 a diagram of input data represented by multiple Gaussian functions according to an embodiment of the invention;

FIGS. 5A-5D are diagrams of components of the distributions of FIG. 4 according to an embodiment of the invention;

FIG. 6 is a diagram of output data approximated the input data by combing the components of FIGS. 5A-5D according to an embodiment of the invention;

FIG. 10 is a diagram of musical notes represented by distributions according to an embodiment of the invention;

FIGS. 11A-11B are diagrams of components of the distributions of FIG. 10 according to an embodiment of the invention;

FIG. 12 is a diagram of output data approximated the input data by combing the components of FIGS. 11A-11B according to an embodiment of the invention;

FIG. 17 is an image of handwriting characters;

FIG. 18A is a diagram of kernel distributions of the characters in FIG. 17, according to an embodiment of the invention;

FIG. 18B is a diagram of corresponding prior distributions for the kernel distributions of FIG. 18A, according to an embodiment of the invention;

FIG. 18C is a diagram of the impulse distribution corresponding to the characters in FIG. 17 according to an embodiment of the invention.

FIG. 19 is an image of results of approximation of the characters in FIG. 17 according to an embodiment of the invention.

DETAILED DESCRIPTION OF THE PREFERRED EMBODIMENT

Figure 1:
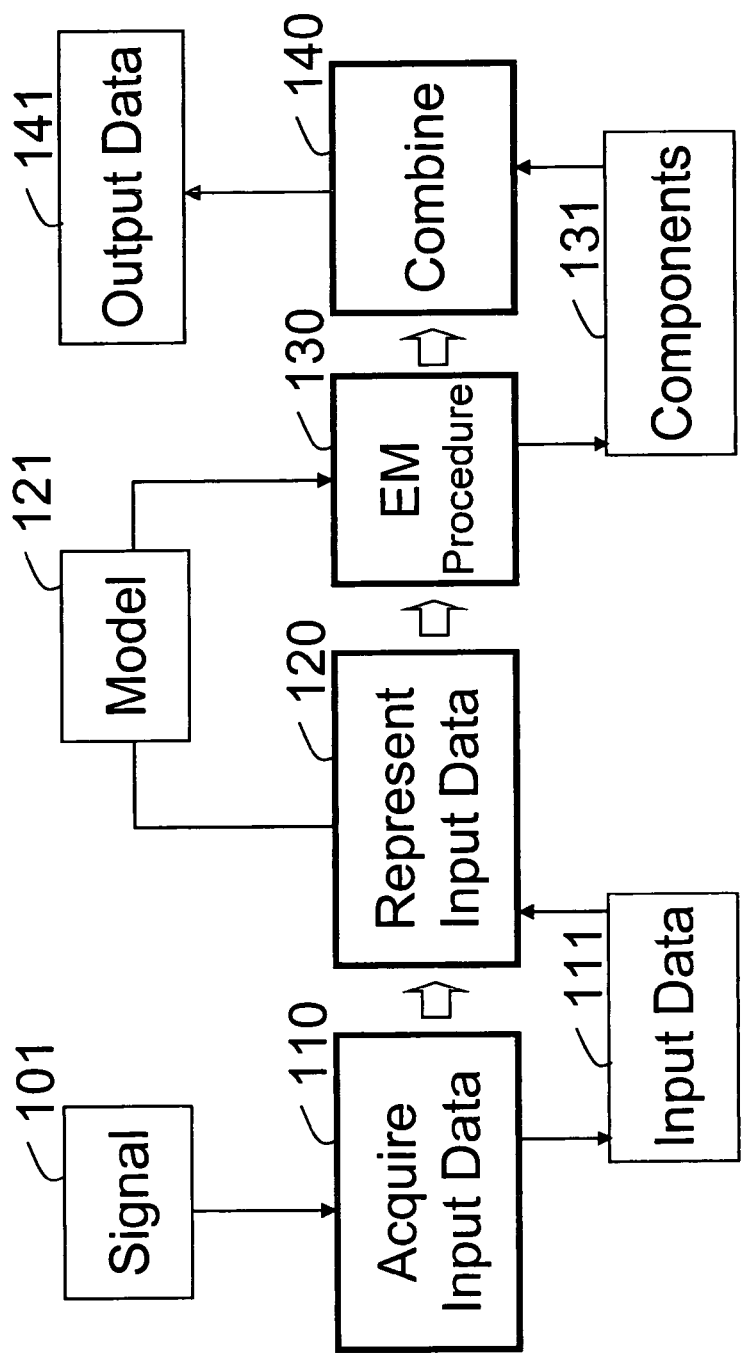
FIG. 1 is a flow diagram of a method for decomposing input data into a set of shift invariant components according to an embodiment of the invention.

As shown in FIG. 1, one embodiment of our invention provides a method 100 for decomposing input signal 101 into a set of shift invariant components 131.

We sample an input signal 101 to acquire 110 input data 111. The signal can be an acoustic signal with temporally shifted magnitude spectra, or an image where pixel intensities are shifted spatially. Other forms of input data are described below. Typically, the input data has a high dimensionality. It is desired to determine low-dimensional components that can be used to approximate high dimensional input data.

We represent 120 the input data 111 by a model 121. The model 121 is a mixture of probability distributions. The probability distributions can be continuous Gaussian functions or discrete histograms.

We apply iteratively an expectation-maximization procedure 130 to the 121 model to determine linearly components 131 of the probability distributions.

The components can be combined 140 to produce output data 141 that approximate the input data 111.

Probabilistic Latent Component Analysis

The embodiments of our invention provide the model 121 and method 100 for decomposing the input signal 101 represented 110 by probability distributions into a set of shift invariant components 131. Our model is defined as:

$$P(x) = \sum_{z} P(z) \prod_{j=1}^{N} P(x_z | z), \quad (1)$$

where $P(x)$ is an N-dimensional distribution of the input signal 101, a random variable $x = x_1, x_2, \ldots, x_N$, Z is a latent variable, and the $P(x_j|z)$ are one dimensional marginal distributions. The latent variable is an index for the set of components that are extracted. The latent variable can take values of, e.g., {1, 2, 3}, in which case we are decomposing to three components. Alternatively, the latent variable can be a continuous variable and take any number of values, including fractional values.

Effectively, our model represents a product of a mixture of the marginal probability distributions to approximate the N-dimensional probability distribution representing the input signal 101. The marginal distributions themselves are dependent on the latent variable z. The model can be used by our method to determine an underlying structure of the input signal 101. This is done by estimating 130 both $P(x_j|z)$ and $P(z)$ from the input data $P(x)$.

The estimation of the marginal probabilities $P(x_j|z)$ is performed using a variant of an expectation-maximization (EM) procedure, which is described in more detail in Appendix A and Appendix B. The EM procedure includes an expectation step and a maximization step. We alternate between these two steps in an iterative manner until a termination condition is reached, for example, a predetermined number of iterations, or a predetermined accuracy.

In the expectation step, we estimate a weight R of the latent variable z:

$$R(x, z) = \frac{P(z) \prod_{j=1}^{N} P(x_j | z)}{\sum_{z'} P(z') \prod_{i=1}^{N} P(x_j | z')}. \quad (2)$$

In the maximization step, we re-estimate the marginal probabilities using the above weight to obtain a new and more accurate estimate:

$$P(z) = \int P(x) R(x,z) dx \quad (3)$$

$$P(x_j | z) = \frac{\int \ldots \int P(x) R(x, z) dx_k, \forall k \neq j}{P(z)}. \quad (4)$$

$P(x_j|z)$ contains a latent marginal distribution, along the dimension of the variable $x_j$ relating to the latent variable z, and $P(z)$ contains the prior probability of that latent variable. Repeating the above EM steps in an alternating manner multiple times produces a converging solution for the marginal probabilities and the latent variable prior probabilities.

The above method can also be adapted to work for discrete variables x and z, or all possible combinations, as described in Appendix B. The method also works when the input data are represented by un-normalized histograms as opposed to probability distributions. The only added measure we need to take in the discrete case is to normalize each $P(x_j|z)$ to integrate or sum to one, in every iteration to ensure that it corresponds to a true marginal distribution.

We describe the use of our decomposition model and method using an example problem. As shown in FIG. 2A, we represent a two dimensional random variable $P(x)$ by three 2D-Gaussian functions with diagonal covariances:

$$x \sim N\left(\begin{bmatrix} 1 \\ -1 \end{bmatrix}, \begin{bmatrix} 0.4 & 0 \\ 0 & 0.4 \end{bmatrix}\right) + \quad (5)$$

$$\frac{1}{2} N\left(\begin{bmatrix} 0 \\ 2 \end{bmatrix}, \begin{bmatrix} 0.7 & 0 \\ 0 & 0.1 \end{bmatrix}\right) + \frac{1}{2} N\left(\begin{bmatrix} -2 \\ 1 \end{bmatrix}, \begin{bmatrix} 0.1 & 0 \\ 0 & 0.4 \end{bmatrix}\right).$$

We sample $P(x)$ and operate in the discrete domain using the discrete forms of the above equations as shown in equations (37, 38, 38) in Appendix B. The latent variable z is also discretized so as to assume only three values, one for each component we desire to extract.

FIGS. 2B-2D show the expected result after forty iterations of our EM-like training. FIG. 2B shows the prior probabilities $P(z_i)$. FIG. 2C shows the marginal probabilities from an up-down dimension $P(x_2, |z_i)$. FIG. 2D shows the marginal probabilities from a left-right dimension $P(x_1, |z_i)$.

FIG. 3 shows an approximation to $P(x)$ using our PLCA model. By combining, e.g., multiplying, pairs of marginal probabilities that are associated with the same latent variable, we can describe all of the Gaussian functions that originally were used to represent $P(x)$. The latent prior probabilities reflect the proper mixing weights, and the relative presence of each Gaussian function. The prior probabilities properly describe a ratio in the mixture, albeit normalized to sum to one.

Shift Invariant Probabilistic Latent Component Analysis

The above model is extended to deal with shift-invariance in real-world data. We discover surprisingly a fundamental relationship with a seemingly unrelated family of processes as described below.

Shift Invariance Along One Dimension

First, we consider the problem where we have a somewhat more complex description for each component than just a product of marginal distributions. We approximate a two-dimensional distribution using a set of left-right 'shifting' two-dimensional kernel distributions:

$$P(x, y) = \sum_z P(z) \int P(x, \tau | z) P(y - \tau | z) d\tau. \quad (6)$$

Instead of multiplying marginal probabilities, we now convolve a "kernel" distribution $P(x, \tau|z)$ with an 'impulse' distribution $P(y-\tau|z)$ along a left-right dimension. The variables y and $\tau$ are cardinal numbers to make the imposed shifting by the convolution operation a meaningful operation.

The kernel distributions extend over both dimensions, whereas the impulse distributions exist only in the dimension on which the convolution takes place. An optimal estimate for the kernel and impulse distributions is $$P(z)=\delta(z), P(y)(y|z=0)=\delta(y), P(x,\tau|z=0)=P(x,y).$$

This solution returns the original distribution P(x, y), without providing any further insight into its structure. To obtain more useful decompositions, we constrain the kernel to be zero outside $[\tau_1, \tau_2]$, i.e., we impose the constraint that $P(x, \tau|z)=0$.

If $P(\tau|z)=\_(y)$, then Equation (6) reduces to the PLCA form in equation (1).

We still estimate all three distributions, i.e., prior probabilities, kernels and impulse, in Equation (6) given P(x, y). In order to perform the estimation using this model, we extend the PLCA method to deal with a convolution operation. The extensions are described in detail in Appendix C.

We apply 130 the EM procedure as described above. A weight of each latent variable in the expectation step is now defined over the parameter $\tau$, as well as the latent variable z, and the weight is:

$$R(x, y, \tau, z) = \frac{P(z)P(x, \tau | z)P(y - \tau | z)}{\sum_{z'} P(z') \int P(x, \tau | z') P(y - \tau | z') d\tau}, \quad (7)$$

and the new estimates for P(z), $P(x, \tau|z)$ and $P(y|z)$ are defined by the proper integrations over the input P(x, y) weighted by the contribution $R(x, y, \tau, z)$:

$$P(z) = \int \int \int P(x,y) R(x,y,\tau,z) dx dy d\tau \quad (8)$$

$$P(x, \tau | z) = \frac{\int P(x, y) R(x, y, \tau, z) dy}{P(z)} \quad (9)$$

$$P(y | z) = \frac{\int \int P(x, y + \tau) R(x, y + \tau, \tau, z) dx d\tau}{\int \int \int P(x, y + \tau) R(x, y + \tau, \tau, z) dx dy d\tau} \quad (10)$$

Just as before, the above equations are iteratively applied until the estimates for P(z), $P(x, \tau|z)$ and $P(y|z)$ converge to a desired solution. In the above equations, the variables x, y and $\tau$ are continuous. However, the same method can be applied to discrete variables as described in Appendix C.

As shown in FIG. 4, this enables us to deal with more complex input data. In this example, we have two repeating and shifted patterns that compose the input distribution P(x, y). One pattern 401 is a Gaussian function oriented from bottom right to top left, and the other pattern 402 is a set of two Gaussian functions that form a 'wedge' oriented towards the top right. Both of these patterns are not easily approximated by products of marginal probabilities as in the above described model. However, the patterns can be modeled by the convolutive model because the patterns exhibit repetition along the left-right axis.

We analyze this distribution using the discrete form as described in Equations (58, 59, 60 and 60) in Appendix C. In this particular example, we limited the kernel distributions so that $P(x, \tau|z)=0$, $\forall \tau<0$, and $\tau>2$. The latent variable z is also discretized and assumes only two values ($z_1$ and $z_2$). The results of the decomposition of the converged convolutive model are shown in FIGS. 5A-D.

FIG. 5A shows the left the latent variable prior probabilities P(z), FIGS. 5B-C show the two kernel distributions $P(x, \tau|z)$ and $P(x, \tau|z)$, and FIG. 5D shows the impulse distributions $P(y|z)$.

FIG. 6 shows a diagram of output data approximated the input data by combing the components of FIGS. 5A-5D.

We see that by convolving the pairs $P(x, \tau|z)$ with $P(y|z)$, we can model the input very well and also discover useful information about its structure. We set the kernel distribution $P(x, \tau|z)$ to be non-zero for only a limited interval of $\tau$. If $P(x, \tau|z)$ are unconstrained, then a variety of other solutions, e.g., $P(x, \tau|z)=P(x, y)$, $P(y|z)=\tau(y)$, can be obtained that may model P(x) better than the solutions obtained in the example. Other forms of partitioning P(x, y) in $P(x, \tau|z)$ and setting $P(y|z)$ to be an appropriate assortment of delta functions also provide an adequate solution. Therefore, like many dimensionality reduction schemes, the limiting of the extent of $P(x, \tau|z)$ forces the kernels to be informative.

Shift Invariance Along Multiple Dimensions

Having dealt with the case of shift invariance on one dimension, we now turn to shift invariance on multiple dimensions. Specifically, because we apply our model to two-dimensional real-world data, such as images and spectrograms, we present the case of shift invariance on both-dimensions of a two-dimensional distribution, whose two dimensions x and y we designate the "left-right" and "up-down" dimensions respectively. Generalizations to an arbitrary number of dimensions are described in Appendix C.

The kernel distributions we derive can be shifted in the left-right dimension, but also in the up-down dimension. The model for this case is defined using a two-dimensional convolution as:

$$P(x, y) = \sum_z P(z) \int \int P(\tau_x, \tau_y | z) P(x - \tau_x, y - \tau_y | z) d\tau_x d\tau_y. \quad (11)$$

We restrict the kernel distributions $P(\tau_x, \tau_y|z)$, such that $P(\tau_x, \tau_y|z)=0$, $\forall (\tau_x, \tau_y) \notin \Re$ $\tau_x$, $\tau_y$, where $\Re$ defines a convex region. $\Re$ is selected such that its extent is smaller than that of the input distribution P(x, y), while the domain of the impulse distributions P(x, y|z) is set to be as large as the input distribution, so that there is space to shift the kernel with respect to the impulse distribution in both dimensions.

A detailed derivation is described in Appendix C. The 'contribution' of each latent variable is over the latent variables, and both the convolution parameters $\tau_x$ and $\tau_y$:

$$R(x, y, \tau_x, \tau_y, z) = \frac{P(z)P(\tau_x, \tau_y \mid z)P(x - \tau_x, y - \tau_y \mid z)}{\sum_z P(z) \int\int P(\tau_x, \tau_y \mid z)P(x - \tau_x, y - \tau_y \mid z)d\tau_x d\tau_y}. \quad (12)$$

As described above, the estimation of the updated prior probabilities, kernel and impulse distributions can be done by the proper integrations:

$$P(z) = \int\int\int\int P(x,y)R(x,y,\tau_x,\tau_y,z)dxdyd\tau_x d\tau_y \quad (13)$$

$$P(\tau_x, \tau_y \mid z) = \frac{\int\int P(x, y)R(x, y, \tau_x, \tau_y, z)dxdy}{P(z)} \quad (14)$$

$$P_I(x, y \mid z) = \frac{\int\int P(x+\tau_x, y+\tau_y)R(x+\tau_x, y+\tau_y, \tau_x, \tau_y, z)dxdy}{\int\int\int\int P(x+\tau_x, y+\tau_y) R(x+\tau_x, y+\tau_y, \tau_x, \tau_y, z)dxdyd\tau_x d\tau_y} \quad (15)$$

The iterative procedure EM procedure is guaranteed to obtain a locally optimal estimate for the kernel and impulse distributions. However, it is advantageous to utilize a modification, whereby, at each iteration, we 'anneal' the kernel by raising the kernel to an exponent:

$$P(\tau_x, \tau_y) \leftarrow c \cdot P(\tau_x, \tau_y)^\alpha, \quad (16)$$

where $0 < \alpha \leq 1$, initially set to a value less than 1, and c is a normalizing constant. As the iterations proceed, it is gradually raised to 1.

This procedure can yield a locally optimal estimate of the kernel and impulse distributions, and the procedure is much more likely to result in 'meaningful' decompositions, wherein the kernel captures most of the repetitive structure in the distribution, while the impulse distribution includes a mixture of impulse, such as peaks, identifying the location of the shifted structures, thereby producing a sparse code.

Figure 7:
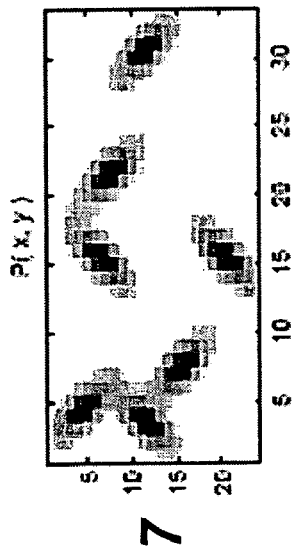
FIG. 7 is a diagram of input data represented by three Gaussian functions according to an embodiment of the invention.
Figure 8A:
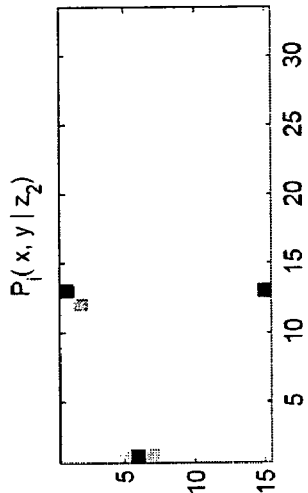
FIGS. 8A-8B are diagrams of components of the distributions of FIG. 7 according to an embodiment of the invention.
Figure 8B:
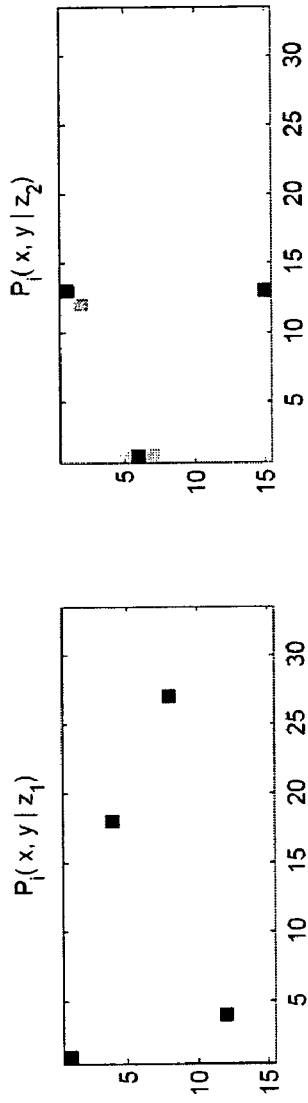
Figure 9:
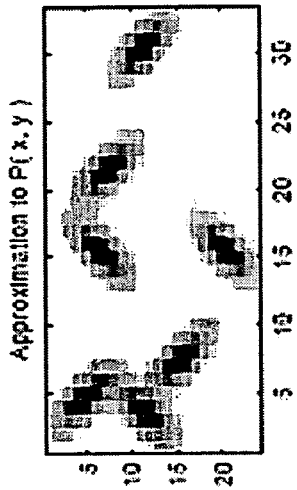
FIG. 9 is a diagram of output data approximated the input data by combing the components of FIGS. 8A-8B according to an embodiment of the invention.

FIG. 7 shows an input distribution P(x, y). The latent variable prior probabilities, kernel and impulse distributions that are extracted are also shown in FIGS. 8A-8B. The kernel distributions have correctly converged to the two shifted forms, whereas the impulse distributions are placed to perform the proper decomposition. Convolving each pair of kernel and impulse distributions, and summing the distributions results in a good approximation of the input distribution as shown in FIG. 9.

Analyzing Real-World Data

We now describe our ability analyze and extract interesting features from complex real world input data. We apply our method to applications in two signaling domains, acoustic and visual. Instead of performing training directly on training data as in the prior art, we perform 'EM-like' training on the distribution or the observed histogram. The reason this is done is to provide a way to analyze certain classes of highly complex distributions and obtain easily interpretable results. The class of distributions that we are most interested in deal with time-frequency distributions of acoustic data, and spatial-intensity distributions of image data.

Acoustic Data

We start with acoustic signals, where we operate on a time-frequency distribution representation. We represent an acoustic signal by a distribution of its energy in time and frequency axes. It is effectively a scaled histogram of acoustic components that fall in each time and frequency grid point.

We start with an example where only one kernel distribution is sought, albeit in multiple shifted positions. Our example input data are recorded piano notes, e.g., C, D, E, F, D, E, C, G.

In a note, most of the signal energy is at a fundamental frequency, which also defines a pitch of the note. Then, decreasing amounts of energy are at higher frequencies, which are integer multiples of the fundamental frequency, the so called harmonics of the note. On a musical instrument, such as the piano. Neighboring notes have essentially the same energy distribution across frequencies, albeit shifted along the frequency axis, assuming a logarithmic frequency spacing representation.

In a time-frequency representation, by playing different notes at different times, we effectively have shifting in both the time axis denoting when the note is played, and the frequency axis denoting which note is played.

FIG. 10 shows a constant-Q time-frequency distribution of the piano note sequence, see Brown, J. C., "Calculation of a Constant Q Spectral Transform," Journal of the Acoustical Society of America vol. 89, pp. 425-434, 1991, incorporated herein by reference.

The harmonic series repeat in various shifted positions to represent each note. We analyzed this time-frequency distribution seeking a single latent variable. Analysis of this distribution results into a kernel function that is a harmonic series as shown in FIG. 11A, and an impulse function that places that series in the time frequency plane as shown in FIG. 11B. The approximation to the reconstructed input is shown in FIG. 12.

The kernel distribution looks very much like a harmonic series, whereas the impulse distribution has energy only at the fundamental frequency. The impulse distribution indicates where the kernels need to be placed to reconstruct the input data. Thus, we have, in an unsupervised manner, discovered that the piano recording was constructed by single harmonic template shifted appropriately in time and frequency. From this analysis, we can define the timbre of a piano note, i.e., the kernel distribution, and also perform a transcription of the 'performance' by noting a maxima of the impulse distribution.

The same results can be obtained when the piano notes overlap in time and are not recorded in relative isolation as in the above example.

In another example application, we extract multiple kernel distributions from a speech signal. We analyze a magnitude spectrogram representation of male speech and determine its kernel distributions. For this application, we use about thirty seconds of male speech obtained from the TIMIT speech database, Zue, "Speech database development at MIT: TIMIT and beyond," Speech Communication, 9, 351-356, 1990, incorporated herein by reference. TIMIT is a standard database used for the development of signal processing and classification processes. We extract 513 frequencies, which results in a discretized input distribution of 513 frequencies over 938 time intervals. We discover 20 latent variables, and we define the kernel distribution size to extend throughout all frequencies but only for 8 time intervals. This kernel size yields bases that are shifted only in time, but not in frequency. Because both the kernel and the input have the same frequency width, there is no space to shift along that dimension.

Figure 13:
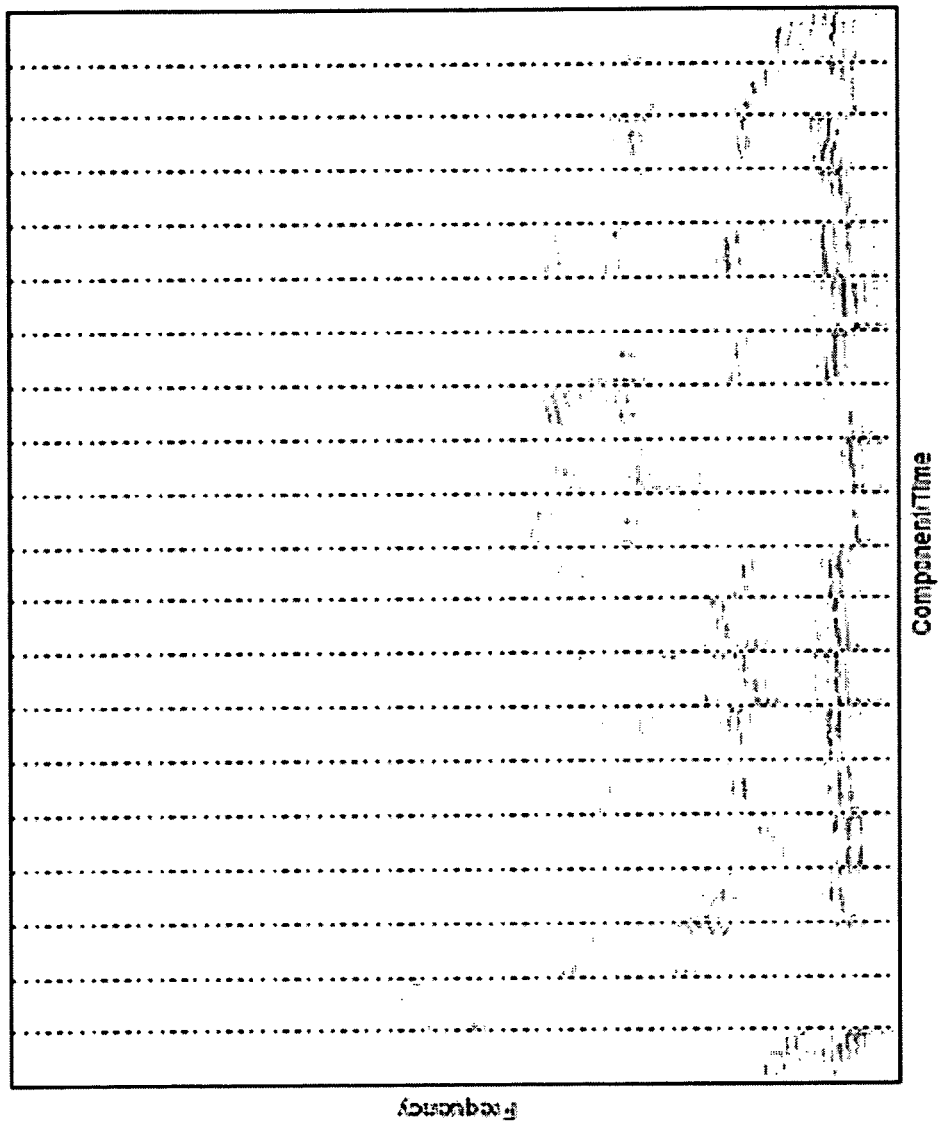
FIG. 13 is a diagram of kernel distributions of magnitude spectrogram of speech according to an embodiment of the invention.

FIG. 13 shows the resulting kernel distributions from an analysis of the magnitude spectrogram of speech. The distributions are stacked from left to right, and separated by dotted lines.

Interestingly, the shape of the distributions correspond to magnitude spectrograms of various speech phonemes, and the time-frequency form of these kernels resemble the structure of various phonemes. One can see a harmonic structure in each kernel distribution, as well as a formant structure characteristic of a phoneme.

Due to the additivity in this model, qualitatively similar results can be obtained when using mixtures of speakers as an input. In effect, we find that the building blocks of speech are indeed phonemes shifted in various parts in time. Analyzing different speaker types results in a different set of kernel distributions, i.e., phonemes, which reflects the unique nature of each speaker.

Image Data

Image data (pixels) can be thought of as distributions, e.g., a probability or count of photons landing on a particular point on an optical sensor, i.e., pixel intensities. Image data can be decomposed by our method to yield interesting results. We start with an example application where we wish to extract a single kernel distribution from a complex image.

Figure 14:
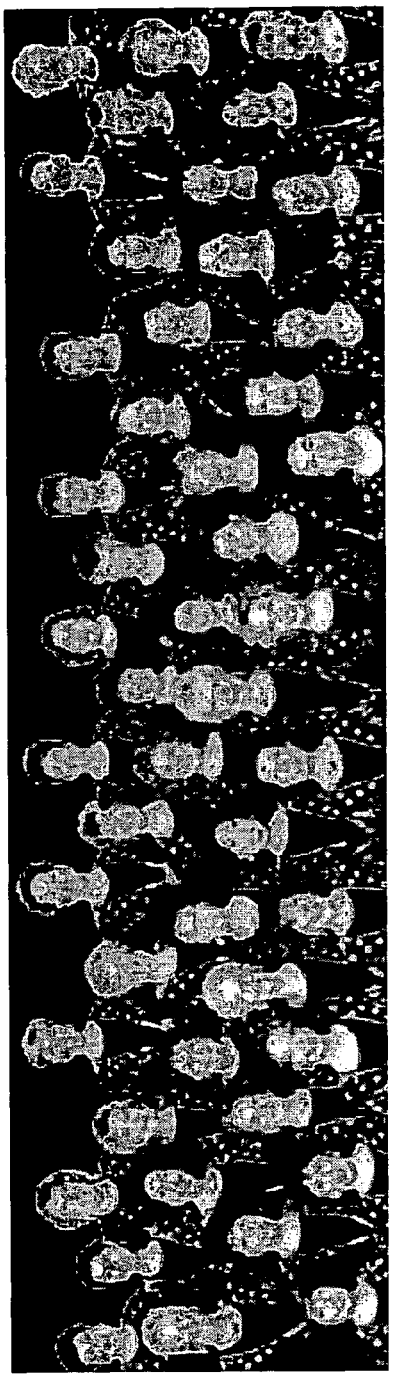
FIG. 14 is an image of a choir with a multitude of heads at various locations in the image.

As shown in FIG. 14, the input data is a 136 by 511 pixel image of a choir with a multitude of heads shifted at various locations in the image. We analyze the input data looking for a single latent variable and kernels of pixel height 32 and width 24.

Figure 16:
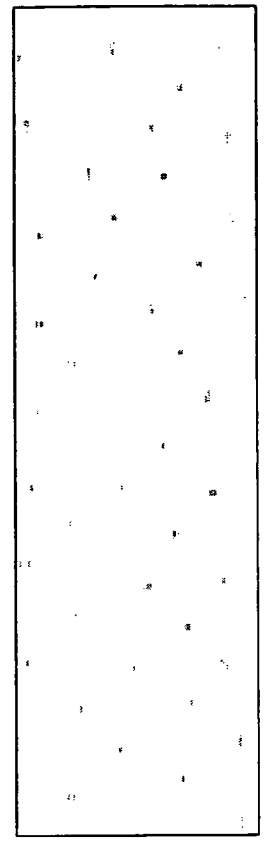
FIG. 16 is a diagram of an impulse distribution of the locations of the heads in FIG. 14 according to an embodiment of the invention.
Figure 15:
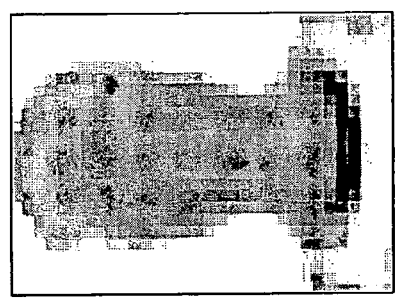
FIG. 15 is a diagram of a kernel distribution of an average head according to an embodiment of the invention.

After analysis of the input image using our method, we obtained a kernel distribution as shown in FIG. 15, with color inversion. The kernel distribution corresponds to the shape and appearance of an 'average' head. The impulse distribution is shown in FIG. 16. The impulse distribution indicates the appropriate shifted locations for each choir member in the input image.

FIG. 17 shows a more complex example, which is a 81 by 113 pixel image of handwriting. Three types characters, e.g., lamda, alpha and gamma, compose the image. The characters are located arbitrarily on an x, y grid. Analyzing the data according to our model and method, we can extract three 15 by 15 kernel distributions shown in FIG. 18A. The three kernel distributions are actually the three characters in the input image. FIG. 18B shows the corresponding prior distributions. The impulse distribution, as shown in FIG. 18C, includes spikes at the locations that correspond to each character in the input image.

FIG. 19 shows that an approximation that results using this decomposition has the surprising property of 'streamlining' the characters and making all instances of the same character look more alike than in the original image. The latent variable prior probabilities, shown in FIG. 18B, essentially indicate an amount of energy contained in each character. The 'alpha', due to a more elaborate stroke, contains more energy from the 'gamma', which in turn contains somewhat more energy than the less elaborate 'lamda'. As in the case of the acoustic data, we can obtain qualitatively the same results, even when the characters overlap.

Other Applications

Our non-convolutive form of PLCA can essentially be characterized as a generalization of Hofmann's probabilistic latent semantic analysis (PLSA), Hofmann, T., "Probabilistic Latent Semantic Analysis," Proceedings of the Fifteenth Conference on Uncertainty in Artificial Intelligence, UAI '99, 1999, incorporated herein by reference.

In association with PLSA, our method relates and enriches well known data mining methods employing latent semantic analysis (LSA), singular value decomposition (SVD), and principal component analysis (PCA).

Our method also is related to PARAFAC, Bro, R., "PARAFAC," Tutorial and applications," in Chemometrics and Intelligent Laboratory Systems, Volume 38, Issue 2, pp. 149-171, October 1997, incorporated herein by reference. A PARAFAC decompositions attempts to factor multi-linear data structures into vector components. That corresponds to PLCA for arbitrary dimensional distributions. A key difference is that PARAFAC processes are predominantly least squares approximations to arbitrary input data, whereas our method is explicitly approximating probability densities by marginal probabilities and has a probabilistic foundation. Versions of the PARAFAC process are known for non-negative inputs. However, to our knowledge no probabilistic or convolutive framework has been described in the prior art.

Also related is non-negative matrix factorization (NMF), Lee D. D., and Seung H. S., "Learning the parts of objects by non-negative matrix factorization," Nature, Vol. 401, No. 6755, pp. 788-791, 21 Oct. 1999, incorporated herein by reference. In NMF, the objective is to factor a non-negative matrix using two lower rank non-negative matrices. An interesting connection between our method and NMF comes through with the cost function, which is minimized when performing NMF. That function is most often an adaptation of the Kullback-Leibler divergence for arbitrary non-negative functions. That divergence is minimized between the input and the product of the estimated factors.

Interestingly enough, the EM procedure we use for PLCA essentially minimize the KL divergence between the input probability density and the density specified product of marginal probabilities. In a way, the left and right factors in NMF correspond to $P(x_1|z)$, and $P(x_2|z)$ with $P(z)$ already factored. Even though the estimation for NMF and our PLCA are radically different, we achieve qualitatively the same results for a wide variety of applications in signal processing.

Subsequent convolutive extensions to NMF directly correspond to convolutive PLCA. In fact all results, which use various forms of NMF, see Smaragdis, P., Brown, J. C., "Non-negative Matrix Factorization for Polyphonic Music Transcription," IEEE Workshop on Applications of Signal Processing to Audio and Acoustics (WASPAA), pp. 177-180, October 2003, Smaragdis, P., "Discovering Auditory Objects Through Non-Negativity Constraints," Statistical and Perceptual Audio Processing (SAPA), SAPA 2004, October 2004, and Smaragdis, P., "Non-negative Matrix Factor Deconvolution; Extraction of Multiple Sound Sources from Monophonic Inputs," International Congress on Independent Component Analysis and Blind Signal Separation, ISBN: 3-540-23056-4, Vol. 3195/2004, pp. 494, September 2004 (Springer Lecture Notes in Computer Science, all incorporated herein by reference, can be replicated using the embodiments described herein.

In some way, our method can be related to positive deconvolution, Li, L., Speed, T., "Deconvolution of sparse positive spikes: is it ill-posed?," University of California at Berkeley, Department of Statistics Technical Report 586, 2000, incorporated herein by reference. This is a particularly desirable operation in the fields of astronomical imaging and bio-informatics. The objective is to obtain a non-negative deconvolution of both a convolved sequence and a filter applied to the sequence. Most prior art methods rely on least-squares formulation.

Our method can be adapted to that problem. If we define the filter to be a kernel distribution, then we can proceed by performing shift invariant PLCA. However, we only update the impulse distribution and keep the kernel distribution fixed to the filter we use for the deconvolution. Due to the lower number of variables to be estimated, convergence is much more rapid than when performing a complete shift invariant PLCA.

A point worthy of some discussion is the exponentiation operation in Equation (16), which we use as a mechanism to ensure sparsity on the impulse distributions. Although we stopped short of a probabilistic explanation, we note that this operation corresponds to information theoretic manipulations.

The 'flattening' that the exponentiation produces causes the entropy of the kernel distributions to increase. Because the data we model have a fixed entropy, the increased kernel entropy is 'borrowed' from the impulse distributions. This forces the entropy of the impulse distributions to decrease, which, in turn, causes this form of sparse learning. Alternatively, we can raise the impulse distributions to a power greater than one to achieve similar results. However, because the kernel distributions are, in general smaller it is more efficient to manipulate them instead. This way of forcing sparsity in such a decomposition related to sparse NMF, Hoyer, P. O., "Non-negative Matrix Factorization with sparseness constraints," Journal of Machine Learning Research 5:1457-1469, 2004, incorporated herein by reference.

One consideration is the number and size of components that are desired. In most of the examples described above, the number and size are known a priori. A larger number of components usually has the effect of distributing the desired result to more components, thereby providing a more detailed description, or otherwise, allocating the components to irrelevant information. Fewer components results in either non-detection of some desired components or a consolidation of multiple desired components into one.

Large components can result in overfitting because there is little space to shift, whereas small components end up being insufficient to model the input desirably. In general, as in many dimensionality reduction processes, it is hard to reliably estimate how many and how large components are correct for an optimal result. However, our probabilistic enables the use of conventional techniques, such as the Schwarz-Bayesian information criterion and other similar measures.

It should also be noted, that if some of the components or their weights are known, then these can be used to find missing components or weights. That is, the method can be used to estimate missing items. This is useful in the case where it is known that there is a specific component that is, e.g., spatially shifted such as an image of a face, and the amount of shift is unknown.

EFFECT OF THE INVENTION

The embodiment of the invention is a method for decomposing probability distributions into shift invariant components. We presented our approach in gradually complicating cases starting from a simple static model to an arbitrary dimensionality and shift invariance model. We also provide an EM procedure to perform the decomposition. The method can be applied to any arbitrary data set.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

APPENDIX A

The Basic Update Rule

The update rules for PLCA are obtained through a variant of the expectation maximization algorithm. We attempt to estimate the parameters $\Lambda$ of a model $P(x;\Lambda)$ for the distribution (or density) of a random variable x, such that the KL divergence between $P(x;\Lambda)$ and the true distribution of x, $P(x)$ is minimized. The KL divergence between the two is defined by:

$$D(P(x)\|P(x;\Lambda))=-E_x \log P(x;\Lambda)-H(x) \quad (17)$$

Here $E_x$ refers to the expectation operator with respect to $P(x)$, the true distribution of x, $H(x)$ is the entropy of x.

Introducing a second random variable z, and the Bayes' rule $$\log P(x,\Lambda)=\log P(x,z;\Lambda)-\log P(z|x;\Lambda)$$

Taking expectaions on both side with respect to $P(z|x;\Lambda')$, i.e. the conditional probability of z obtained with any parameter $\Lambda'$, and noting that $\log P(x;\Lambda)$ does not depend on z, $$\log P(x;\Lambda)=E_{z|x;\Lambda'}\{\log P(x,z;\Lambda)\}-E_{z|x;\Lambda'}\{\log P(z|x;\Lambda)\} \quad (18)$$

Combining the above Equation 17, $$D(P(x)\|P(x;\Lambda))=-E_x\{E_{z|x;\Lambda'}\{\log P(x,z;\Lambda)\}\}+E_x\{E_{z|x;\Lambda'}\{\log P(z|x;\Lambda)\}\}-H(x) \quad (19)$$

$$D(P(x)\|P(x;\Lambda))-D(P(x)\|P(x;\Lambda'))=E_x\{E_{z|x;\Lambda'}\{\log P(x,z;\Lambda')\}-E_{z|x;\Lambda'}\{\log P(x,z;\Lambda)\}\}-D(P(z|x;\Lambda')\|P(z|x;\Lambda)) \quad (20)$$

The KL divergence between two distributions is always non-negative (Theorem 2.6.3 in (11)), i.e. $D(P(z|x;\Lambda')\|P(z|x;\Lambda))\geq 0 \ \forall \Lambda$. Hence, assuredly, $$E_x\{E_{z|x;\Lambda'}\{\log P(x,z;\Lambda)\}\}\geq E_x\{E_{z|x;\Lambda'}\{\log P(x,z;\Lambda')\}\} \Rightarrow D(P(x)\|P(x;\Lambda))\leq D(P(x)\|P(x;\Lambda')) \quad (21)$$

I.e., the distance between $P(x|\Lambda)$ and $P(x)$ is assuredly lesser than or equal to the distance between $P(x)$ and $P(x|\Lambda')$ if $\Lambda$ minimizes $E_x\{E_{z|x;\Lambda'}\{\log P(x,z;\Lambda)\}\}$. This leads to the following iterative update rule for the parameters of $P(x;\Lambda)$:

$$\Lambda^{(n+1)}=\mathrm{argmax}_\Lambda Q(\Lambda, \Lambda^{(n)})$$

$$Q(\Lambda, \Lambda^{(n)})=E_x\{E_{z|x;\Lambda^{(n)}}\{\log P(x,z;\Lambda)\}\} \quad (22)$$

where $\Lambda^{(n)}$ is the estimate obtained for $\Lambda$ in the $n^{th}$ update. Iterations of Equation 22 will result estimates of $\Lambda$ that will monotonically decrease $D(P(x)\|P(x;\Lambda))$.

APPENDIX B

Update Rules For Non-Convolutive Mixture Models

We define an "integral" operator $I_x\{f(x)\}$ such that for a continous variable x $I_x\{f(x)\}=\int_{-\infty}^{\infty}f(x)dx$, while for a discrete random variable $I_x\{f(x)\}=\Sigma_x f(x)$. By the definition of the operator, $I_x\{I_y\{f(x,y)\}\}=I_y\{I_x\{f(x,y)\}\}$, $I_x\{P(x)\}=1$ and $I_x\{P(x)g(x)\}=E_x g(x)$.

A non-convolutive mixture model for the distribution of the data is $$P(x; \Lambda) = I_z\left\{P(z)\prod_j P(x_j \mid z)\right\} \quad (23)$$

where $x=\{x_j\}$. Note that the above formulation places no restriction on z, which might be either continuous or discrete. Similary each $x_j$ can be continous or discrete. The parameters of this distribution are $P(z)$ and $P(x_j|z)$, i.e. $\Lambda=\{P(z),P(x_j|z): \forall(z,j)\}$. We will denote the estimates obtained in the $n^{th}$ update by the superscript (n).

Let us define $$R(x, z) \equiv P^{(n)}(z \mid x) = \frac{P^{(n)}(z)\prod_j P^{(n)}(x_j \mid x)}{I_{z'}\left\{P^{(n)}(z')\prod_j P^{(n)}(x_j \mid z')\right\}} \quad (24)$$

We can now write $$E_{z|x;\Lambda^{(n)}}\{\log P(x, z; \Lambda)\} = I_z\left\{R(x, z)\log\left(P(z)\prod_j P(z_j \mid x)\right)\right\} \quad (25)$$

$$= I_z\left\{R(x, z)\left(\log P(z) + \sum_j \log P(x_j \mid z)\right)\right\}$$

The update equations are easily derived from Equations 22 and 25, with the additional incorporation of Lagrangian terms to enforce the constraints that the total probablility masses under $P(z)$ and $P(x_j|z)$ are unity.

We can express the constrained form of the equation to be optimized as:

$$\Lambda^{(n+1)} = \mathrm{argmax}_\Lambda \, Q(\Lambda, \Lambda^{(n)}) \quad (26)$$

$$Q(\Lambda, \Lambda^{(n)}) = E_x\{I_z\{R(x, z)\log P(z)\}\} + \quad (27)$$

$$E_x\left\{I_z\left\{\sum_j R(x, z)\log P(x_j \mid z)\right\}\right\} -$$

$$\lambda I_z\{P(z)\} - I_z\left\{\sum_j \lambda_{z,j}I_{x_j}\{P(x_j \mid z)\}\right\}$$

$$= I_z\{E_x\{R(x, z)\}\log P(z) - \lambda P(z)\} +$$

$$I_z\left\{\sum_j \{E_x\{R(x, z)\log P(x_j \mid z)\} - \lambda_{z,j}I_{x_j}\{P(x_j \mid z)\}\}\right\}$$

We note that in general the optimization of $I_x\{h(g(x))\}$ with respect to $g(x)$ leads to $$\frac{d\,h(g(x))}{d\,g(x)} = 0$$

both for discrete and continous x, by direct differentation in the former case and by the calculus of variations in the latter.

The $(n+1)^{th}$ estimate of $P(z)$ is obtained by optimizing $Q(\Lambda,\Lambda^n)$ with respect to $P(z)$, which gives us $$\frac{E_x\{R(x, z)\}}{P^{(n+1)}(z)} - \lambda = 0 \quad (28)$$

$$\lambda P^{(n+1)}(z) = E_x\{R(x, z)\}$$

Since $I_z\{P^{(n+1)}(z)\}=1$ and $I_z\{R(x,z)\}=1$, applying the $I_z\{.\}$ operator to both sides of Equation 28 we get $\lambda=1$, leading the update equation $$P^{(n+1)}(z)=E_z\{R(x,z)\} \quad (29)$$

To derive the $(N+1)^{th}$ estimate of $P(x_j|z)$ we first note from reference (10) that $$E_z\{R(x,z)\log P(x_j|z)\}=E_{x_j}\{\log P(z_j|z)E_{x|x_j}\{R(x,z)\}\} \quad (30)$$

We can therefore rewrite $Q(\Lambda, \Lambda^{(n)})$ as $$Q(\Lambda, \Lambda^{(n)}) = I_z\left\{\sum_j \{E_{x_j}\{\log P(x_j \mid z)E_{x|x_j}\{R(x, z)\}\} - \quad (31)\right.$$

$$\left. \lambda_{z,j}I_{x,j}\{P(x_j \mid z)\}\}\right\} + C$$

$$= I_z\left\{\sum_j \{I_{x_j}\{P(x_j)\log P(x_j \mid z)E_{x|x_j}\{R(x, z)\} - \right.$$

$$\left. \lambda_{z,j}P(x_j \mid z)\}\}\right\} + C$$

where C represents all terms that are not a function of $P(x_j|z)$. $P(x_j)$ is true marginal density of $x_j$. Optimizing $Q(\Lambda, \Lambda^{(n)})$ with respect to $P^{(n+1)}(x_{j|z})$, we obtain $$\frac{P(x_j)E_{x|x_j}\{R(x, z)\}}{P^{(n+1)}(x_j \mid z)} - \lambda_{z,j} = 0 \quad (32)$$

$$P(x_j)E_{x|x_j}\{R(x, z)\} = \lambda_{z,j}P^{(n+1)}(x_j \mid z).$$

Since $I_{x_j}\{P^{(n+1)}(x_j|z)\}+1$, we can apply the $I_{x_j}\{.\}$ operator to both sides of teh above equation to obtain $$\lambda_{i,j}=I_{x_j}\{P(x_jE_{x|x_j}\{R(x,z)\}\}=E_{x_j}\{E_{x|x_j}\{R(x,z)\}\}=E_x\{R(x,z)\}=P^{(n+1)}(z) \quad (33)$$

and $$P^{(n+1)}(x_j \mid z) = \frac{P(x_j)E_{x|x_j}\{R(x, z)\}}{P^{(n+1)}(z)} = \frac{I_{x/x_j}\{P(x)R(x, z)\}}{P^{(n+1)}(x)} \quad (34)$$

where $x/x_j=\{x_i:i\neq j\}$ represents the set of all components of x excluding $x_j$. Equations 29 and 34 form the final update equations.

If z is a discrete random variable, the non-convolutive mixture model is given by $$P(x; \Lambda) = \sum_z P(z)\prod_j P(x_j \mid z) \quad (35)$$

The update equations are given by $$R(x, z) \equiv \frac{P(z)\prod_j P(x_j | z)}{\sum_{z'} P(z')\prod_j P(x_j | z')} \quad (36)$$

$$P^{(n+1)}(z) = I_x\{P(x)R(x, z)\} \quad (37)$$

$$P^{(n+1)}(x_j | z) = \frac{I_{x/x_j}\{P(x)R(x, z)\}}{P^{(n+1)}(z)} \quad (38)$$

If x is a discrete random variable, (i.e. every $x_j$ is discrete), the specific form of the update rules (Equations 29 and 34) are:

$$P^{(n+1)}(x) = \sum_j \sum_{x_j} P(x)R(x, z) \quad (39)$$

$$P^{(n+1)}(x_j | z) = \frac{\sum_{i:i \neq j} \sum_{x_j} P(x)R(x, z)}{P^{(n+1)}(z)} \quad (40)$$

If x is a continous random variable (i.e. every $x_j$ is continuous), the update equations become:

$$P^{(n+1)}(z) = \int_{-\infty}^{\infty} P(x)R(x, z) dx \quad (41)$$

$$P^{(n+1)}(x_j | z) = \frac{\int_{-\infty}^{\infty}\int_{-\infty}^{\infty}\ldots\int_{-\infty}^{\infty} P(x)R(x, z) dx_1 dx_2 \ldots dx_i \forall i \neq j}{P^{(n+1)}(z)} \quad (42)$$

APPENDIX C

Update Rules For Shift-Invariant Mixture Models

The shift-invariant mixture model models the distribution of some dimensions of a multi-variate random variable as sa convolution of a density kernel and a shift-invariant "impulse" density. As before, let x be the mulit-variate random variable. Let y represent the set of components of x that are modelled in a shift-invariantmanner, and w the rest of the components, i.e. $x = w \cup y$ and $w \cap y = \emptyset$ where ø represents the null set).

The shift-invariant model for the distribution of x models it as follows:

$$P(x; \Lambda) = I_z\{P(z) I_\tau\{P(w, \tau|z) P(y-\tau|z)\}\} \quad (43)$$

where τ is a random variable that is defined over the same domain as y. The terms to be estimated are $P(z), P(w, \tau|z)$ and $P(y|z)$, i.e. $\Lambda = \{P(z), P(w, \tau|z), P(y|z)\}$. Note that Equation 43 assumes that the random variable y is cardinal, irrespective of whether it is discrete or continuous. Also, as before, z may be either continous or discrete.

Let us define $$R(x, \tau, z) = \quad (44)$$

$$R(w, y, \tau, z) \equiv P^n(z, \tau | x) = \frac{P^{(n)}(z) P^{(n)}(w, \tau|z) P^{(n)}(y-\tau|z)}{I_{z'}\{P(z') I_{\tau'}\{P(w, \tau'|z') P(y-\tau'|z')\}\}}$$

$$R(x, z) \equiv I_\tau\{R(w, y, \tau, z)\} = P^{(n)}(z|x) \quad (45)$$

The $(n+1)^{th}$ estimate of P(z) is derived identically as Appendix B and is given by $$P^{(n+1)}(z) = E_x\{R(x, z)\} \quad (46)$$

We claim:

1. A computer-implemented method for decomposing input data acquired of a signal, comprising the steps of:
   sampling an input signal to acquire input data;
   representing the input data as a probability distribution, in which the probability distribution is defined as $$P(x) = \sum_z P(z) \prod_{j=1}^{N} P(x_z | z),$$

where P(x) is an N-dimensional distribution of a random variable $x = x_1, x_2, \ldots, x_N$, z is a latent variable, and $P(x_j|z)$ are one-dimensional marginal distributions; and
   applying iteratively an expectation-maximization procedure to the probability distribution to determine components of the probability distributions;
   combining the components; and
   producing output data from the combined components, the output data approximating the input data;
   storing the output data in a computer-readable medium.

2. The method of claim 1, in which the signal is an acoustic signal.

3. The method of claim 1, in which the signal is an image.

4. The method of claim 1, in which the components have a reduced dimensionality than the input data.

5. The method of claim 1, in which the probability distribution is represented by arbitrary functions.

6. The method of claim 5, in which the arbitrary functions are continuous Gaussian functions.

7. The method of claim 1, in which the probability distribution is represented by discrete histograms.

8. The method of claim 1, in which the components are shift invariant.

9. The method of claim 1, in which the latent variable is discrete.

10. The method of claim 1, in which the latent variable is continuous.

11. The method of claim 1, in which the expectation maximization process includes an expectation step and a maximization step, and in which the steps are iterated until a termination condition is reached.

12. The method of claim 11, in which the expectation maximization process produces a sparse code.

13. The method of claim 1, further comprising:
   estimating a weight R of the latent variable z according to $$R(x, z) = \frac{P(z) \prod_{j=1}^{N} P(x_j | z)}{\sum_{z'} P(z') \prod_{i=1}^{N} P(x_j | z')}.$$

14. The method of claim 13, further comprising:
   re-estimating the marginal probabilities using the weight to obtain more accurate estimates $$P(z) = \int P(x) R(x, z) dx,$$

and $$P(x_j \mid z) = \frac{\int \ldots \int P(x) R(x, z) dx_k, \forall k \neq j}{P(z)},$$

in which $P(x_j|z)$ contains the latent marginal distribution, along a dimension of the variable $x_j$ relating to the latent variable z, and P(z) contains a prior probability of that latent variable.

15. The method of claim 1, in which the input data are continuous.

16. The method of claim 1, in which the input data are discrete.

* * * * *